United States Patent [19]
Tsai

[11] Patent Number: 5,349,483
[45] Date of Patent: * Sep. 20, 1994

[54] SLIDING HARD DISK DRIVE MOUNTING HARDWARE

[76] Inventor: I-Shou Tsai, 2F-1, No. 5, Lane 678, Sec. 4, PA TEH Rd., Taipei, Taiwan

[*] Notice: The portion of the term of this patent subsequent to Feb. 16, 2010 has been disclaimed.

[21] Appl. No.: 957,831

[22] Filed: Oct. 8, 1992

[51] Int. Cl.⁵ .................... G11B 5/012; G11B 33/02; H05K 7/10
[52] U.S. Cl. .................. 360/97.01; 361/685; 361/725; 369/75.1
[58] Field of Search .................. 369/75.1; 360/98.01, 360/97-98; 361/380, 391-395, 679, 683, 684, 685, 725-727; 364/708

[56] References Cited

U.S. PATENT DOCUMENTS

| | | | |
|---|---|---|---|
| 4,912,580 | 3/1990 | Hanson | 369/75.1 |
| 4,941,841 | 7/1990 | Darden et al. | 369/75.1 |
| 5,068,652 | 11/1991 | Kobayashi | 364/708 |
| 5,098,175 | 3/1992 | Cooke et al. | 312/341.1 |
| 5,155,662 | 10/1992 | I-Shou | 361/391 |
| 5,187,643 | 2/1993 | I-Shou | 361/391 |
| 5,233,594 | 8/1993 | Wilhelm | 360/98.01 |

Primary Examiner—Robert S. Tupper
Assistant Examiner—Brian E. Miller
Attorney, Agent, or Firm—Lowe, Price, LeBlanc & Becker

[57] ABSTRACT

A sliding hard disk drive mounting hardware includes a sliding box inserted in a recessed chamber on a computer mainframe and releasably locked in place through tenon-and-mortise joints to hold a hard disk drive for permitting the i/o port of the hard disk drive to be electrically connected to the master board of the computer mainframe through an interference elimination circuit board and an interface circuit board. A LED indicator is turned on by means of the control of a control card as the hard disk drive is installed to produce a signal of low potential, or turned off as the hard disk drive is not installed.

1 Claim, 3 Drawing Sheets

SLIDING HARD DISK DRIVE MOUNTING HARDWARE

BACKGROUND OF THE INVENTION

The present invention relates to a sliding hard disk drive mounting hardware which fastens a hard disk drive to a computer mainframe by a sliding box and which automatically turns on a LED indicator as the hard disk drive is installed.

A notebook computer generally has a hard disk drive equipped on the inside of the mainframe thereof. Because the hard disk drive is fixed inside the mainframe, it can not be detached for repair work conveniently.

SUMMARY OF THE INVENTION

It is one object of the present invention to provide a hard disk drive mounting hardware which fastens a hard disk drive to a computer mainframe for permitting the hard disk drive to be drawn out of the computer mainframe and then pushed back into place. It is another object of the present invention to provide a hard disk drive mounting hardware which has indicator means to indicate the correct installation.

According to one aspect of the present invention, the hard disk drive mounting hardware comprises a sliding box inserted in a recessed chamber on a computer mainframe and releasably locked in place through tenon-and-mortise joints to hold a hard disk drive for permitting the i/o port of the hard disk drive to be electrically connected to the master board of the computer mainframe through an interference elimination circuit board and an interface circuit board. According to another aspect of the present invention, the computer mainframe has a LED on the outside connected to the master board thereof, which is turned on by means of the control of a control card as the hard disk drive is installed to produce a signal of low potential, or turned off as the hard disk drive is not installed.

DETAILED DESCRIPTION OF THE PREFERRED EMBODIMENT

Figure 1:
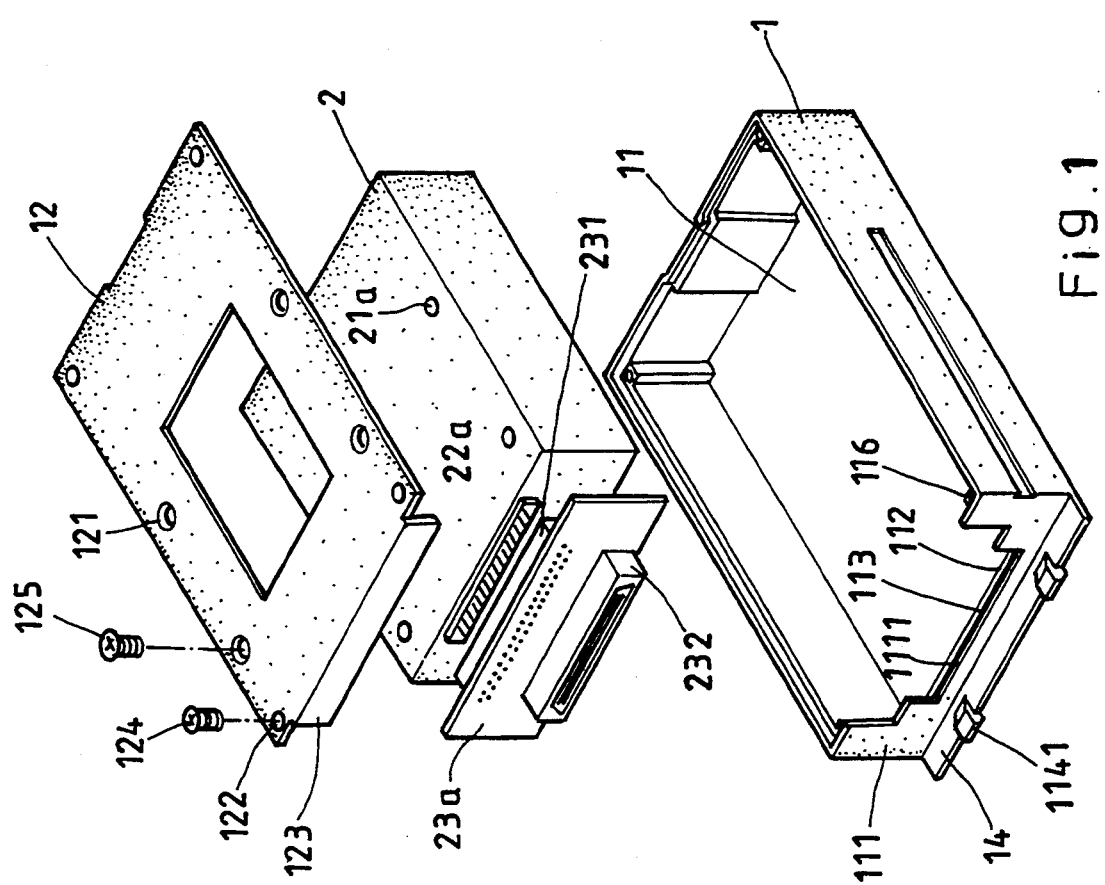
FIG. 1 is an exploded view of a sliding hard disk drive as constructed in accordance with the present invention.
Figure 2:
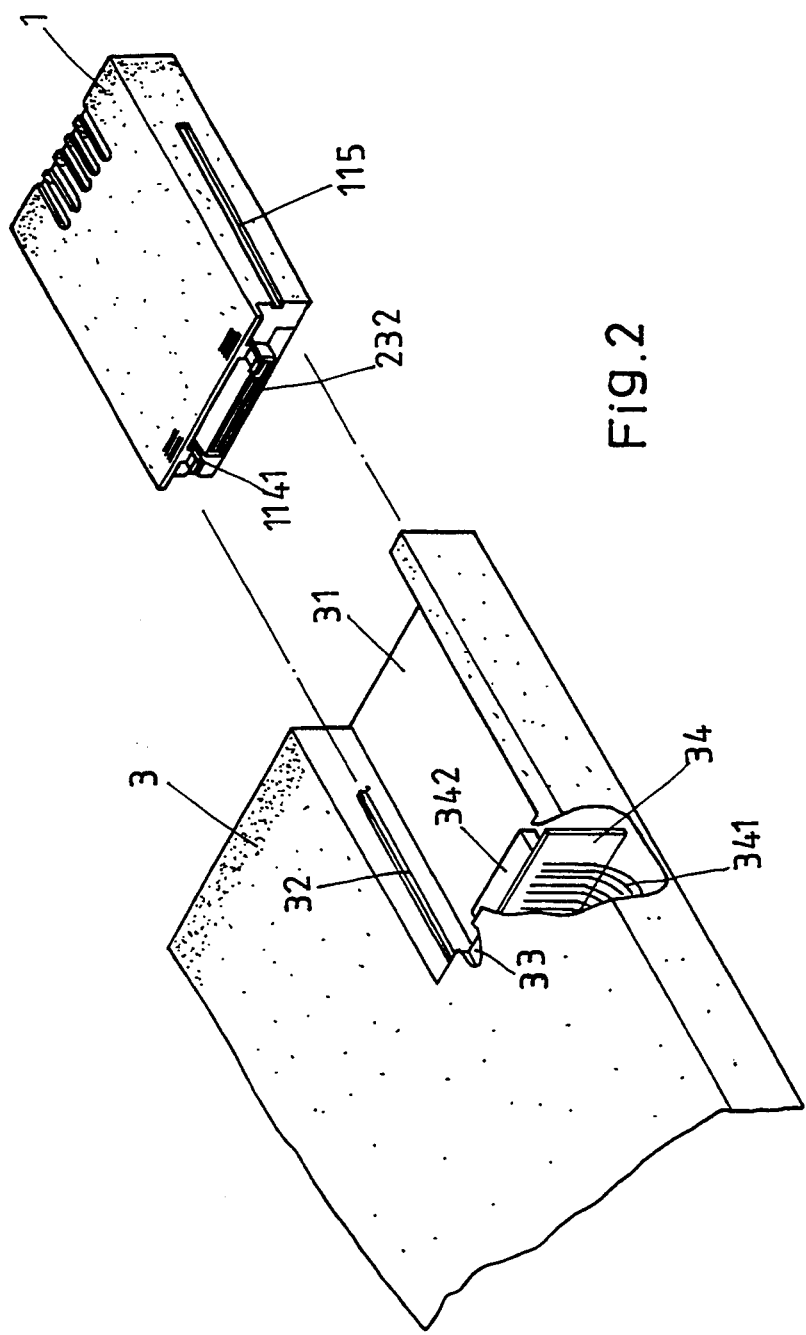
FIG. 2 is an exploded view of a sliding hard disk drive mounting hardware according to the present invention.
Figure 3:
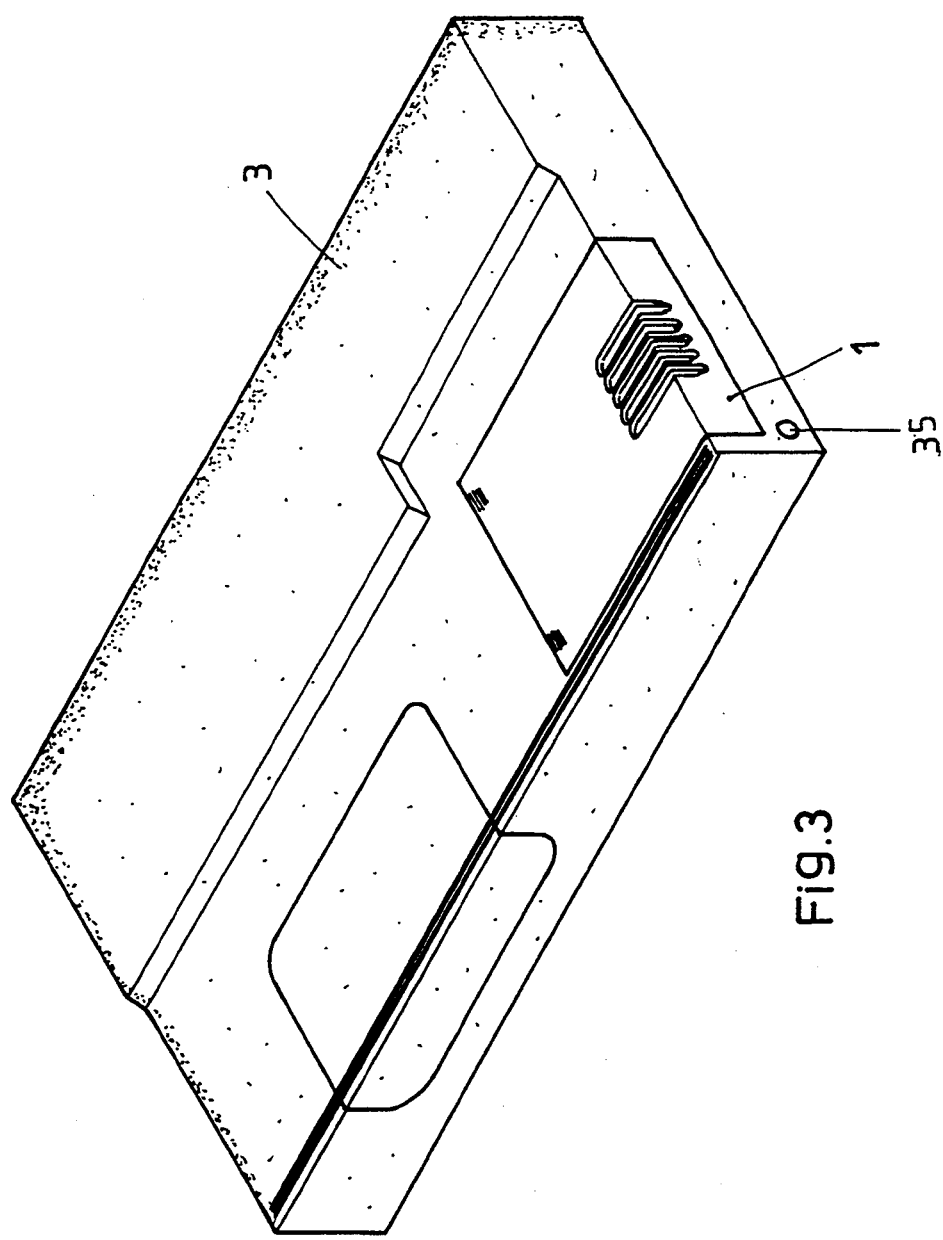
FIG. 3 is an elevational view of the mainframe showing the sliding hard disk drive fastened in place.

Referring to FIGS. 1, 2 and 3, the preferred embodiment of the present invention is comprised of a sliding box 1, a hard disk drive 2, and a computer mainframe 3. The sliding box 1 is consisted of a flat, rectangular box body 11 covered with a cover 12. The box body 11 comprises a trapezoidal opening 1111 on a vertical front wall 111 thereof, a transverse rail 112 behind the vertical front wall 111, a channel 113 formed between the vertical front wall 111 and the transverse rail 112, a horizontal guide board 14 extended outwards from the root of the vertical front wall 111, two tenons 1141 spaced on the horizontal guide board 14, two longitudinal grooves 115 on two opposite vertical side walls thereof on the outside, and four screw holes 116 on the inside four corners thereof. The cover 12 comprises a plurality of countersunk holes 121,122 around the border, and a downward plate 123 adjacent to a front end thereof. The hard disk drive 2 has a plurality of screw holes 21a spaced on a top surface thereof, a terminal assembly 22a on a front end thereof connected to a connector 231 on one side of a interference elimination circuit board 23a. The circuit board 23a has a connector 232 on an opposite side detachably connected to the mainframe 3. The arrangement of the circuit board 23a is to eliminate outside static interference. The mainframe 3 has a recessed chamber 31 into which the sliding box 1 fits, two side rails 32 inside the recessed chamber 31 on two opposite sides, two spaced mortises 33, an interface circuit board 34 having a connector 342 on one side toward the recessed chamber 31 and being connected to a master board (not shown) by a flat cable 341, and a LED 35 on a peripheral wall thereof electrically connected to the master board.

The assembly process of the present invention is simple and outlined hereinafter. The hard disk drive 2 is placed inside the box body 11, the circuit board 23a is inserted in the channel 113 with the connector 231 connected to the terminal assembly 22a of the hard disk drive 2 and retained in the trapezoidal opening 111 by the downward plate 123 of the cover 12; which is covered on the box body 11 and secured in place by threading screws 124 through the countersunk holes 122 on the four corners of the cover 12 into the screw holes 116 on the box body 11. When assembled, the sliding box 1 is inserted into the recessed chamber 31 by means of fitting the two side rails 32 into the two elongated grooves 115 and retained in place by fitting the tenons 1141 into the mortises 33, permitting the connector 232 of the interference elimination circuit board 23a to connect to the connector 342 of the interface circuit board 34.

What is claimed is:

1. A sliding hard disk mounting hardware comprising:

a hard disk drive having a plurality of screw holes spaced on a top surface thereof, an input/output port attached with an interference elimination circuit board assembly, said interference elimination circuit having a mainframe connector on the outside;

a sliding box consisted of a flat, rectangular box body covered with a cover to hold said hard disk drive, said box body having a trapezoidal opening on a vertical front wall thereof, a channel behind said trapezoidal opening, a horizontal guide board extended outwards from said vertical front wall, two tenons spaced on said horizontal guide board, two longitudinal grooves on two opposite vertical side walls thereof on the outside, and four screw holes on inside four corners thereof, said cover comprising a first set of countersunk holes respectively connected to the four screw holes on said box body by screws, a second set of countersunk holes respectively connected to the screw holes on said hard disk drive by screws, and a downward plate adjacent to a front end thereof stopped against said interference elimination circuit board above said mainframe connector;

a computer mainframe having a recessed chamber into which said sliding box fits, two side rails inside said recessed chamber on two opposite sides respectively fitted into said two longitudinal grooves on said box body, two spaced mortises into which said two tenons on said box body fit respectively, an interface circuit board having a connector on one side toward said recessed chamber for connecting said mainframe connector of said interference elimination circuit board of said hard disk drive to a master board through a flat cable, a LED indicator on a peripheral wall thereof electrically connected to said master board; and wherein said LED indicator is turned on by means of the control of a control card as said hard disk drive is installed to produce a signal of low potential, or turned off as said hard disk drive is not installed.

* * * * *